(12) United States Patent
Chen et al.

(10) Patent No.: US 7,380,988 B1
(45) Date of Patent: Jun. 3, 2008

(54) LINEAR MOTION GUIDE DEVICE HAVING DUST SHIELD

(75) Inventors: Scotte Chen, Taichung (TW); Yu Wen Tsai, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 296 days.

(21) Appl. No.: 11/274,764

(22) Filed: Nov. 15, 2005

(51) Int. Cl.
*F16C 33/72* (2006.01)
*F16C 29/08* (2006.01)

(52) U.S. Cl. .......................... 384/15; 384/45
(58) Field of Classification Search ............ 384/14–16, 384/43–45; 269/73, 285; 310/12–14, 88
See application file for complete search history.

(56) References Cited

U.S. PATENT DOCUMENTS

| | | | | |
|---|---|---|---|---|
| 5,080,498 A * | 1/1992 | Tsukada | ........................ | 384/15 |
| 5,087,130 A * | 2/1992 | Tsukada | ........................ | 384/15 |
| 5,209,575 A * | 5/1993 | Ohtake | ........................ | 384/15 |
| 5,265,963 A * | 11/1993 | Kawaguchi | ................... | 384/43 |
| 5,340,219 A * | 8/1994 | Agari | ........................... | 384/15 |
| 5,342,127 A * | 8/1994 | Agari | ........................... | 384/15 |
| 5,358,336 A * | 10/1994 | Agari | ........................... | 384/15 |
| 5,360,271 A * | 11/1994 | Agari | ........................... | 384/15 |
| 5,387,038 A * | 2/1995 | Abe et al. | ...................... | 384/15 |
| 5,451,109 A * | 9/1995 | Ichida | ........................... | 384/15 |
| 5,464,288 A * | 11/1995 | Tanaka | ......................... | 384/15 |
| RE35,323 E * | 9/1996 | Ohtake | ......................... | 384/15 |
| 5,598,043 A * | 1/1997 | Hirano et al. | ................. | 310/12 |
| 6,030,124 A * | 2/2000 | Moseberg et al. | ............ | 384/15 |
| 6,042,269 A | 3/2000 | Konomoto | ..................... | 384/45 |
| 6,170,986 B1 * | 1/2001 | Hsu et al. | ...................... | 384/15 |
| 6,241,230 B1 * | 6/2001 | Kawaguchi | ................... | 269/73 |
| 6,250,805 B1 * | 6/2001 | Kuwahara | ..................... | 384/15 |
| 6,520,681 B2 | 2/2003 | Ishihara | ........................ | 384/45 |
| 6,626,571 B2 * | 9/2003 | Kato et al. | .................... | 384/15 |
| 6,851,857 B2 * | 2/2005 | Miyata | ......................... | 384/45 |
| 6,902,322 B2 * | 6/2005 | Matsumoto | ................... | 384/15 |
| 7,150,564 B2 * | 12/2006 | Lee | .............................. | 384/45 |

\* cited by examiner

*Primary Examiner*—Marcus Charles
(74) *Attorney, Agent, or Firm*—Charles E. Baxley

(57) ABSTRACT

A linear motion guide device includes a slide having a housing, and two end caps secured to sides of the housing and each including a space aligned with a chamber of the housing, for slidably receiving an elongate track rail. One or more dust shields each includes one end detachably anchored to one of the end caps with such as one or more catches, and the other end detachably anchored to the other end cap with such as one or more latches or fingers, for detachably securing the dust shield to the end caps and the housing without additional fasteners. The end caps and the housing each includes a recess for receiving and seating the dust shield.

7 Claims, 12 Drawing Sheets

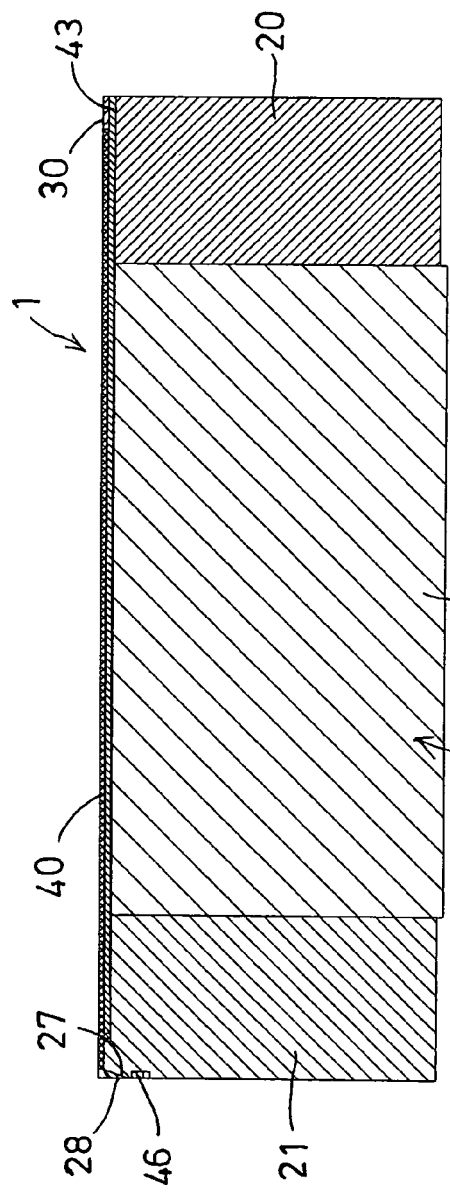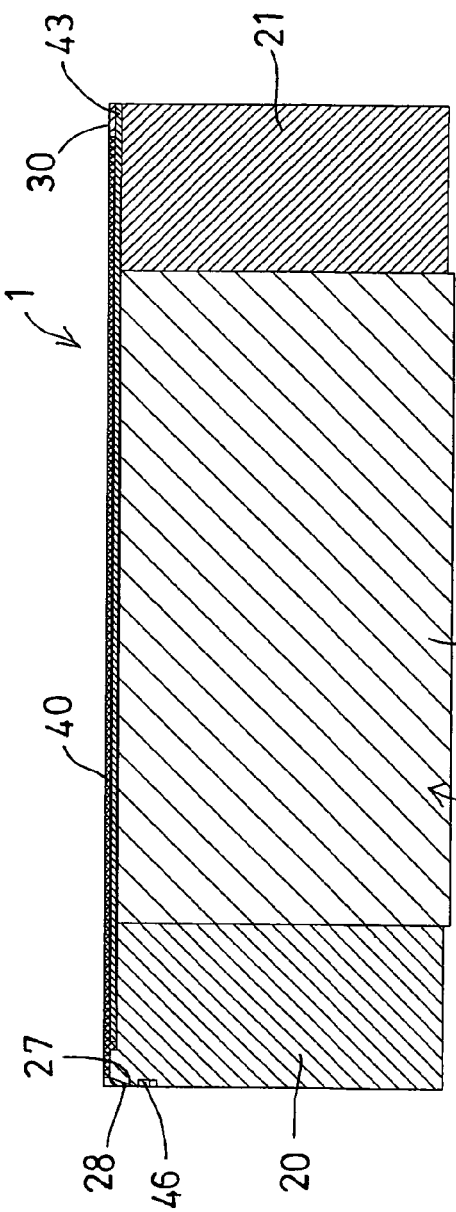

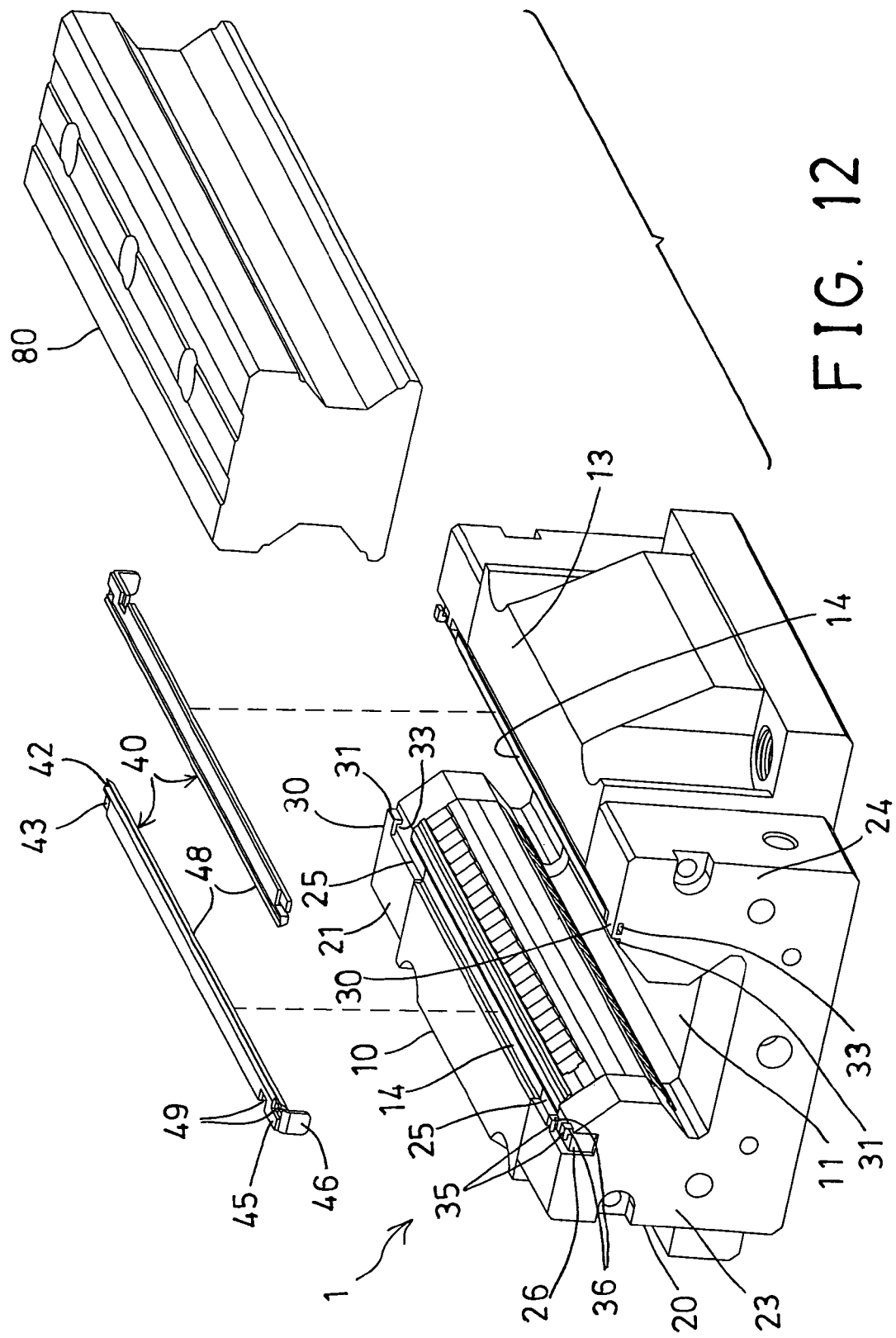

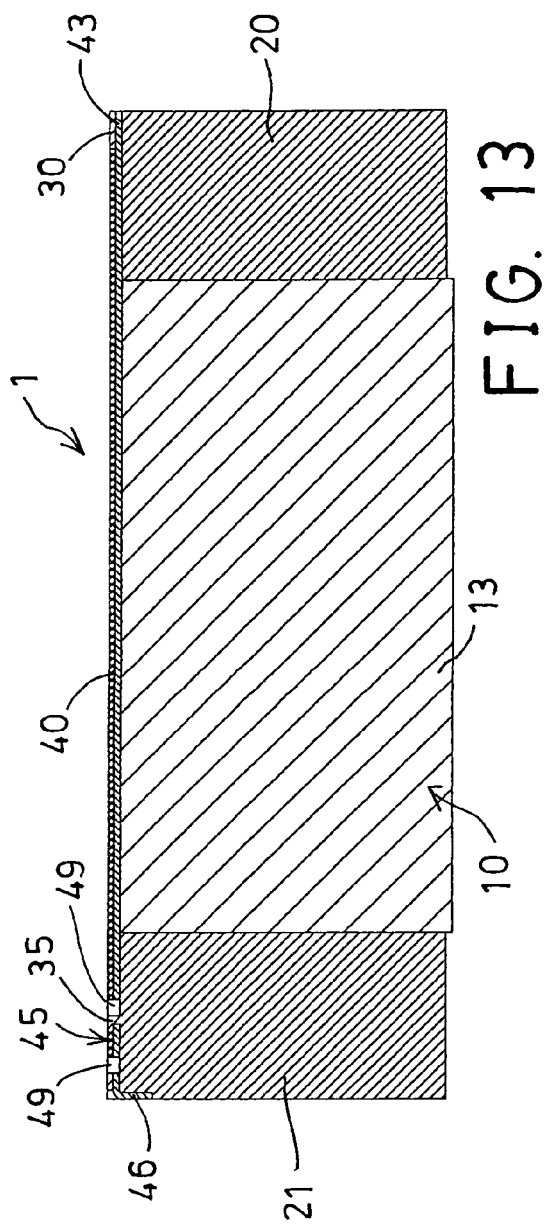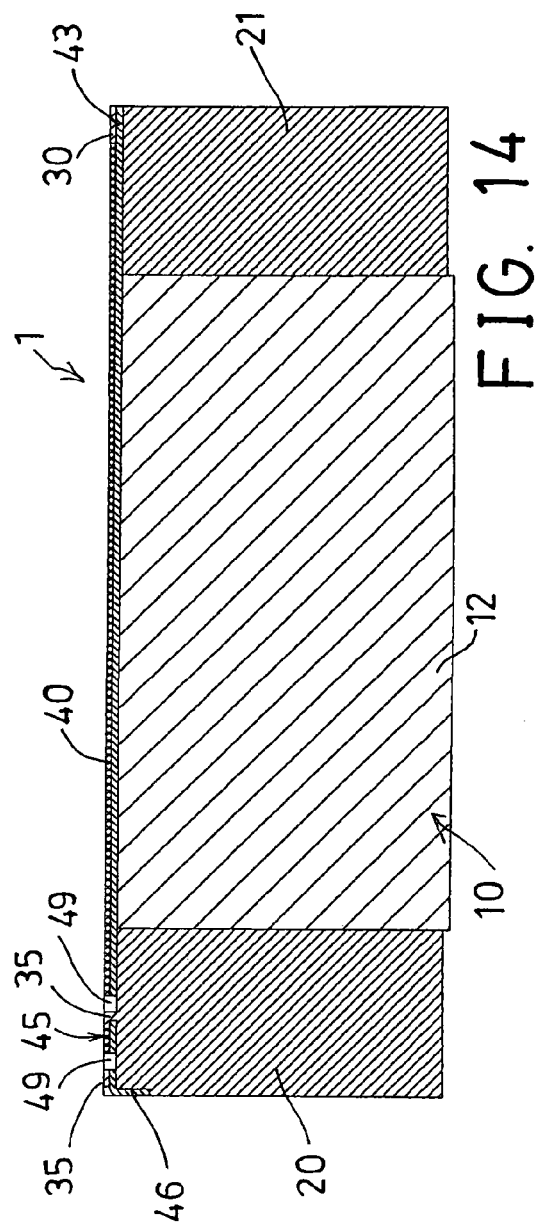

LINEAR MOTION GUIDE DEVICE HAVING DUST SHIELD

BACKGROUND OF THE INVENTION

1. Field of the Invention

The present invention relates to a linear motion guide device, and more particularly to a linear motion guide device having a readily attachable and detachable dust cap or dust shield, without additional fasteners and tool members.

2. Description of the Prior Art

Various kinds of typical linear motion guide devices have been developed and comprise a bearing device or a slider slidably attached onto and movable along an elongate track rail which is normally arranged or disposed on a stationary portion, such as a bed of a machine tool, for guiding a movable member, such as a table along the elongate track rail. A number of, such as four endless rolling elements or bearing elements are normally required to be disposed between the slider and the elongate track rail, for smoothly guiding the slider to move along the elongate track rail.

For allowing the endless rolling elements or bearing elements to be smoothly engaged between the slider and the elongate track rail, a lubricating grease or oil should be filled or supplied into the endless rolling elements or bearing elements for reducing the friction between the slider and the elongate track rail and the endless rolling elements or bearing elements, and one or more dust caps or dust shields are required to be provided between the slider and the elongate track rail, for preventing dirt or contaminant from entering into the endless rolling elements or bearing elements and the lubricating grease or oil.

For example, U.S. Pat. No. 6,042,269 to Konomoto discloses one of the typical linear motion guide devices and also comprises a bearing device or a slider slidably attached onto and movable along an elongate track rail, and a number of, such as four endless rolling elements or bearing elements disposed between the slider and the elongate track rail, for smoothly guiding the slider to move along the elongate track rail.

However, in Konomoto, no dust caps or dust shields have been provided and disposed between the slider and the elongate track rail, such that dirt or contaminant may easily enter into the endless rolling elements or bearing elements and may easily contaminate the lubricating grease or oil, and such that the slider and the elongate track rail and the endless rolling elements or bearing elements may be easily scrubbed and damaged after contaminated.

U.S. Pat. No. 6,520,681 to Ishihara discloses another typical linear motion guide device including a slider having a carriage secured within a carriage frame, and slidably engaged onto a track rail, and four recirculating circuit allowing rolling elements to run through. The carriage frame includes two bottom plates each having a lip extended toward the track rail to provide bottom seals of the slider.

However, the lips of the bottom plates are formed integral with the carriage frame and should be made with the same materials for the carriage frame, and thus may not be made with soft or resilient materials that may be better to provide the bottom seals of the slider. In addition, the bottom plates may not be detached or disengaged from the carriage frame, and thus may not be changed with the other ones when the lips have been damaged or have become failure.

The present invention has arisen to mitigate and/or obviate the afore-described disadvantages of the conventional linear motion guide devices.

SUMMARY OF THE INVENTION

The primary objective of the present invention is to provide a linear motion guide device including a readily attachable and detachable dust cap or dust shield, without additional fasteners and tool members.

In accordance with one aspect of the invention, there is provided a linear motion guide device comprising a slide including a housing having a chamber formed therein, and defined by two side walls, a first end cap and a second end cap secured to sides of the housing, and each including a space formed therein and defined by two side fences, and aligned with the chamber of the housing, for slidably receiving an elongate track rail, and a dust shield including a first end detachably anchored to the first end cap, and a second end detachably anchored to the second end cap, for detachably securing the dust shield to the first and the second end caps without additional fasteners.

The first and the second end caps and the housing each includes a recess formed therein and communicating with each other, for receiving the dust shield. The first end cap includes a catch extended therefrom, the dust shield includes a perforation formed therein for receiving the catch of the first end cap and for detachably locking the dust shield to the first end cap.

The dust shield includes an ear extended therefrom, and having the perforation formed therein for receiving the catch of the first end cap. The catch of the first end cap includes an inclined surface formed thereon, for facilitating an engagement of the catch into the perforation of the dust shield.

The second end cap includes a socket opening formed therein, and the dust shield includes a finger extended therefrom and engageable into the socket opening of the second end cap, for detachably securing the dust shield to the second end cap. The dust shield includes a blade attached thereon for engaging with the track rail, and for providing a seal to the slide.

The dust shield includes a latch extended therefrom and spaced away from the finger with a slot, for engaging with the second end cap, and for further detachably securing the dust shield to the second end cap. The second end cap includes a notch formed therein for receiving the latch of the dust shield.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 4, 5, 6 are cross sectional views of the linear motion guide device, taken along lines 4-4, 5-5, and 6-6 of FIG. 2 respectively;

FIG. 12 is a partial exploded view of the linear motion guide device as shown in FIGS. 10, 11;

FIGS. 13, 14, 15 are cross sectional views of the linear motion guide device, taken along lines 13-13, 14-14, and 15-15 of FIG. 11 respectively;

DETAILED DESCRIPTION OF THE PREFERRED EMBODIMENT

Figure 1:
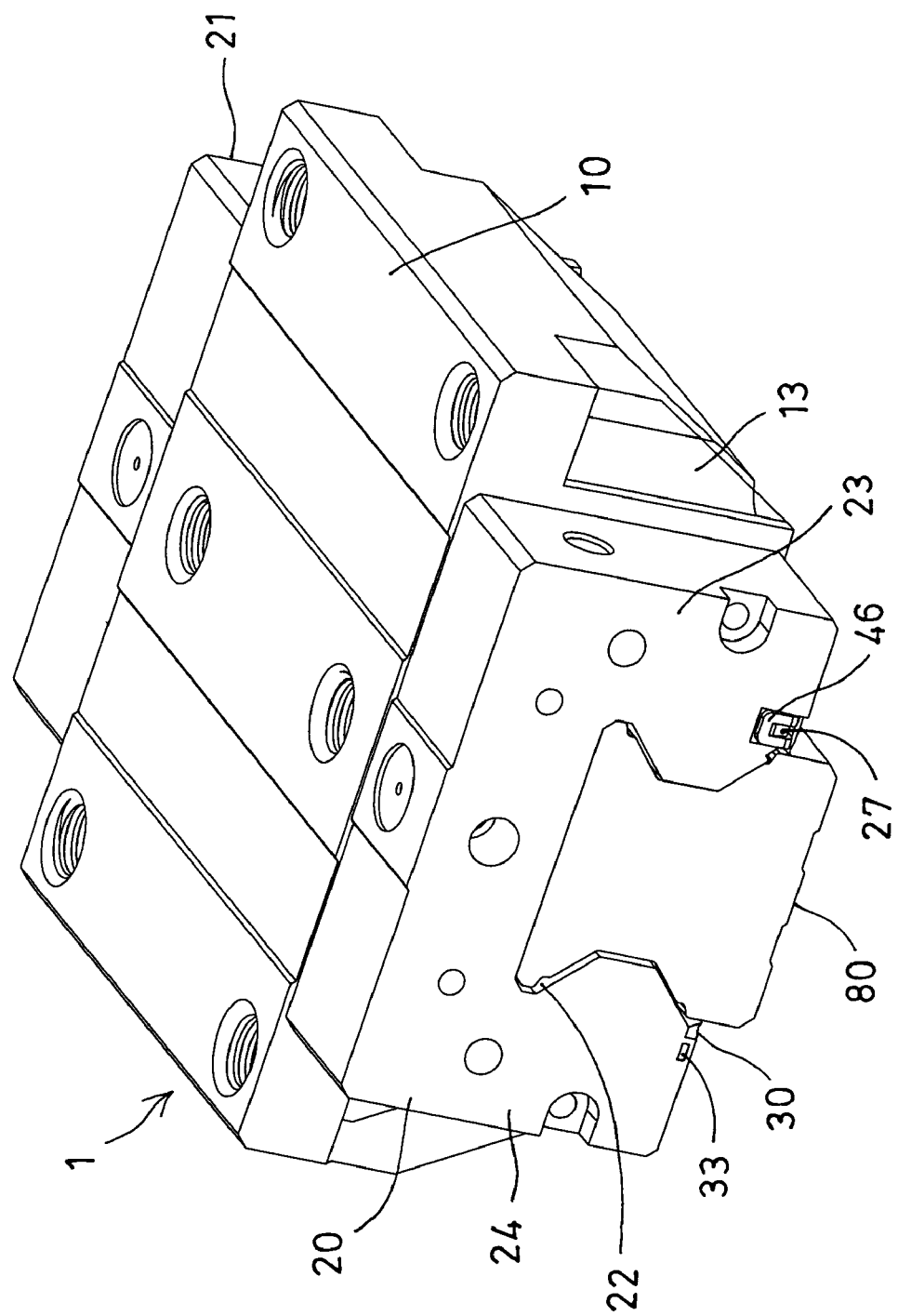
FIG. 1 is an upper perspective view of a linear motion guide device in accordance with the present invention.
Figure 2:
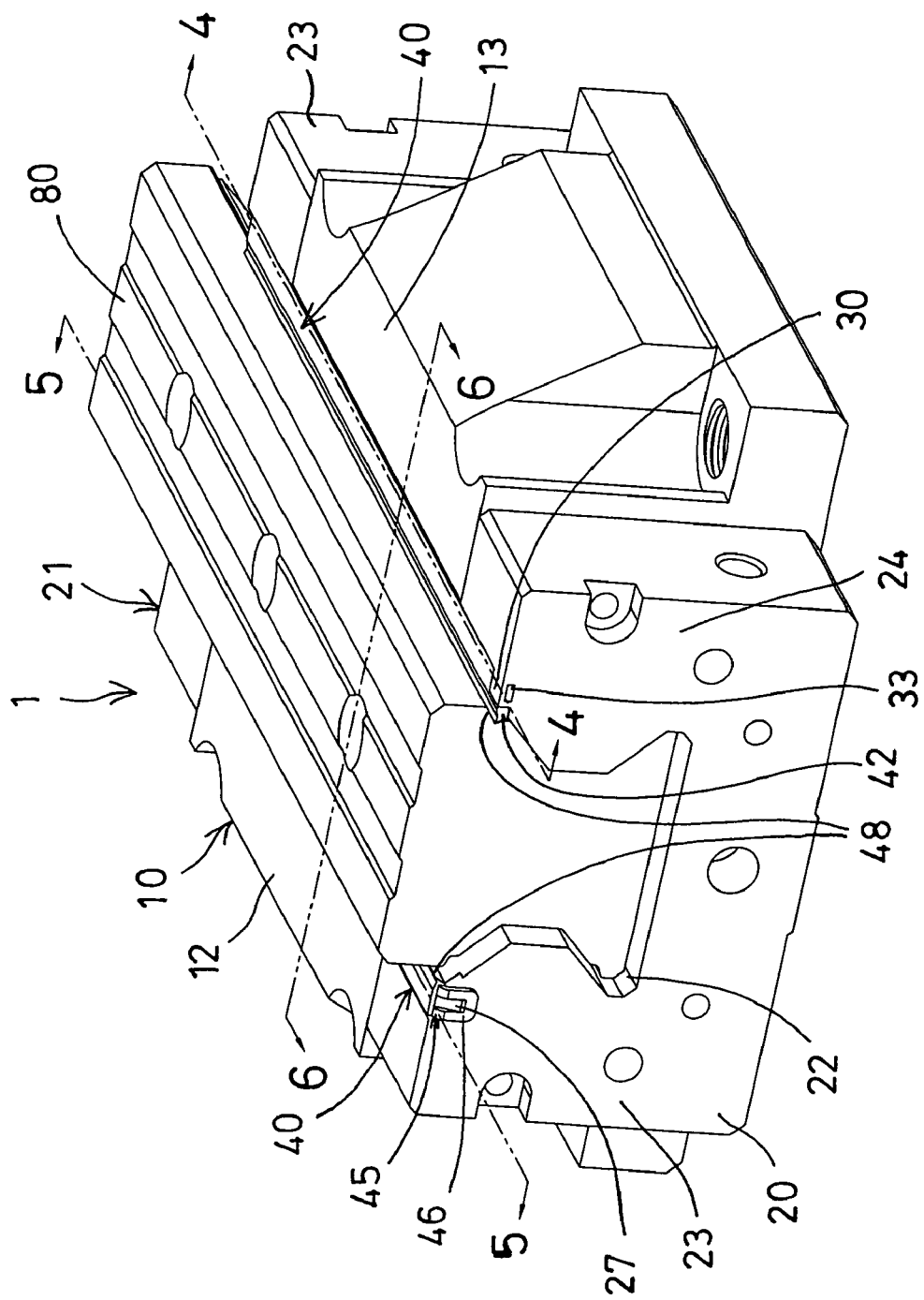
FIG. 2 is a bottom perspective view of the linear motion guide device.

Referring to the drawings, and initially to FIGS. 1-6, a linear motion guide device in accordance with the present invention comprises a main body device or a slider 1 slidably attached onto and movable along an elongate track rail 80 which is normally arranged or disposed on a stationary portion, such as a bed of a machine tool (not shown), for guiding a movable member, such as a table (not shown) along the elongate track rail 80.

Figure 3:
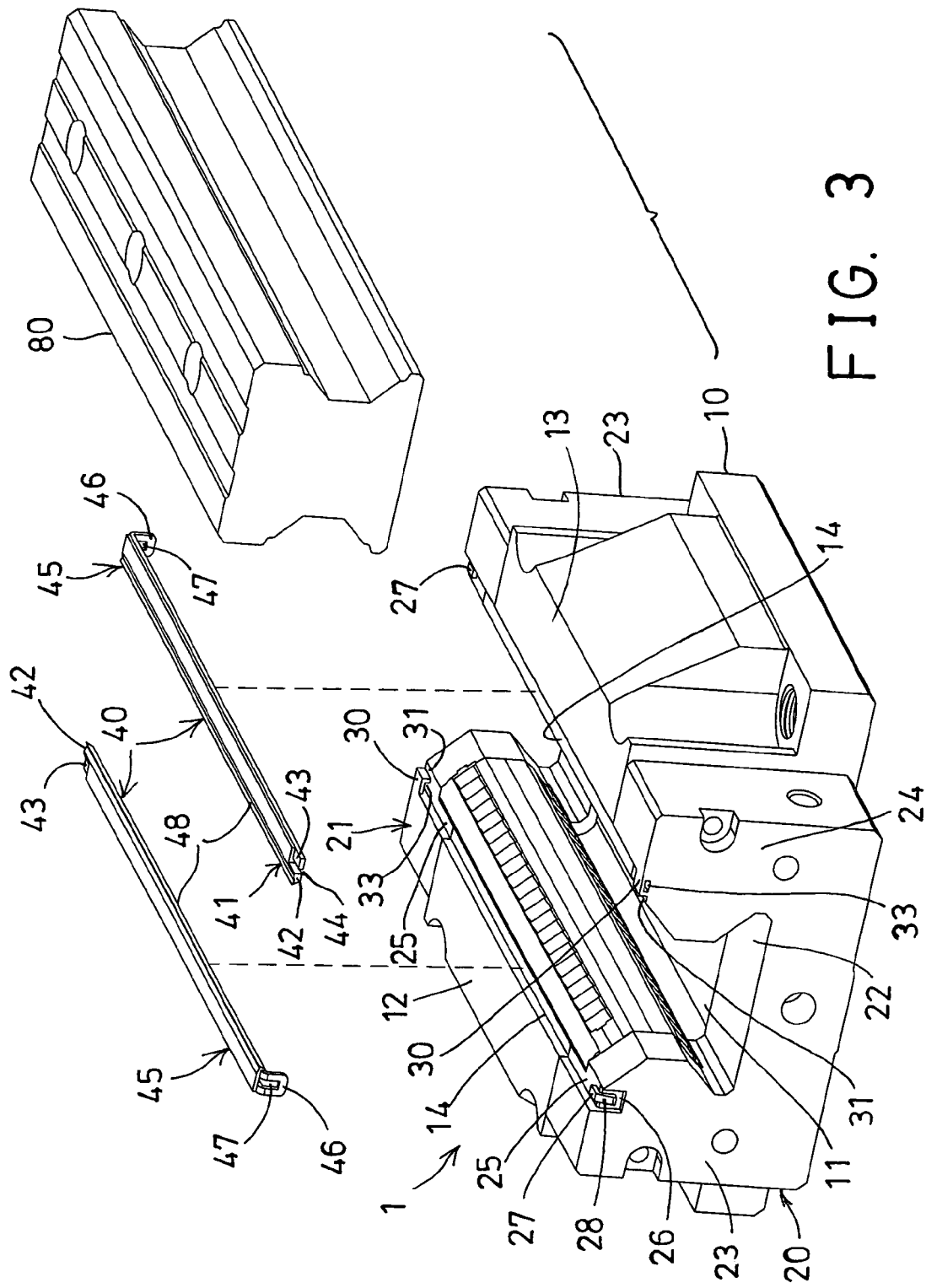
FIG. 3 is a partial exploded view of the linear motion guide device.
Figure 6:
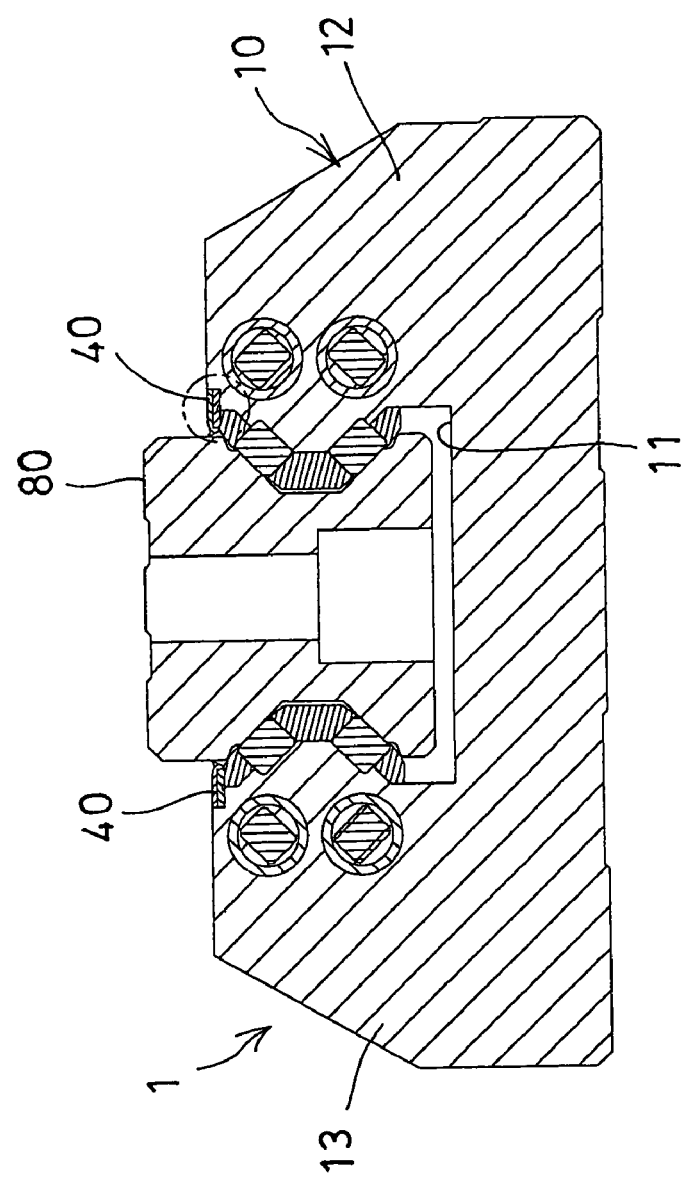

The slider 1 includes an outer housing 10 having a chamber 11 formed therein, best shown in FIGS. 3 and 6, and defined by two side walls 12, 13, and having a shoulder or recess 14 formed in each of the two side walls 12, 13 (FIGS. 3 and 8-9), and communicating with the chamber 11 thereof. Two end caps 20, 21 are secured to the sides of the outer housing 10 with such as fasteners (not shown) or the like, and each includes a space 22 formed therein and defined by two side fences 23, 24, and aligned with the chamber 11 of the outer housing 10, for slidably receiving the elongate track rail 80.

The end caps 20, 21 each further includes a shoulder or recess 25 formed in each of the two side fences 23, 24 (FIGS. 3 and 8-9), and communicating with the space 22 thereof, and aligned with the shoulder or recesses 14 of the outer housing 10, for receiving or engaging or seating and anchoring dust caps or dust shields 40 therein respectively, which are provided for forming or making seals between the housing 10 and the end caps 20, 21 and the elongate track rail 80.

Figure 8:
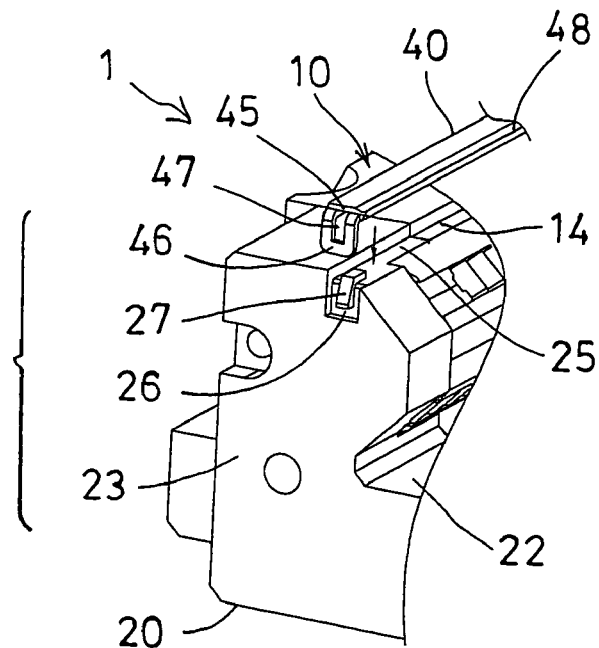
FIGS. 8, 9 are partial exploded views illustrating the attachment of the dust cap or dust shield to the housing and the end caps of the linear motion guide device.
Figure 9:
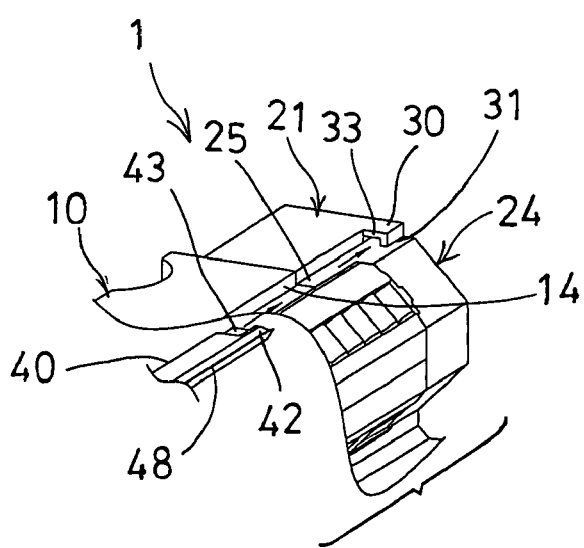
Figure 10:
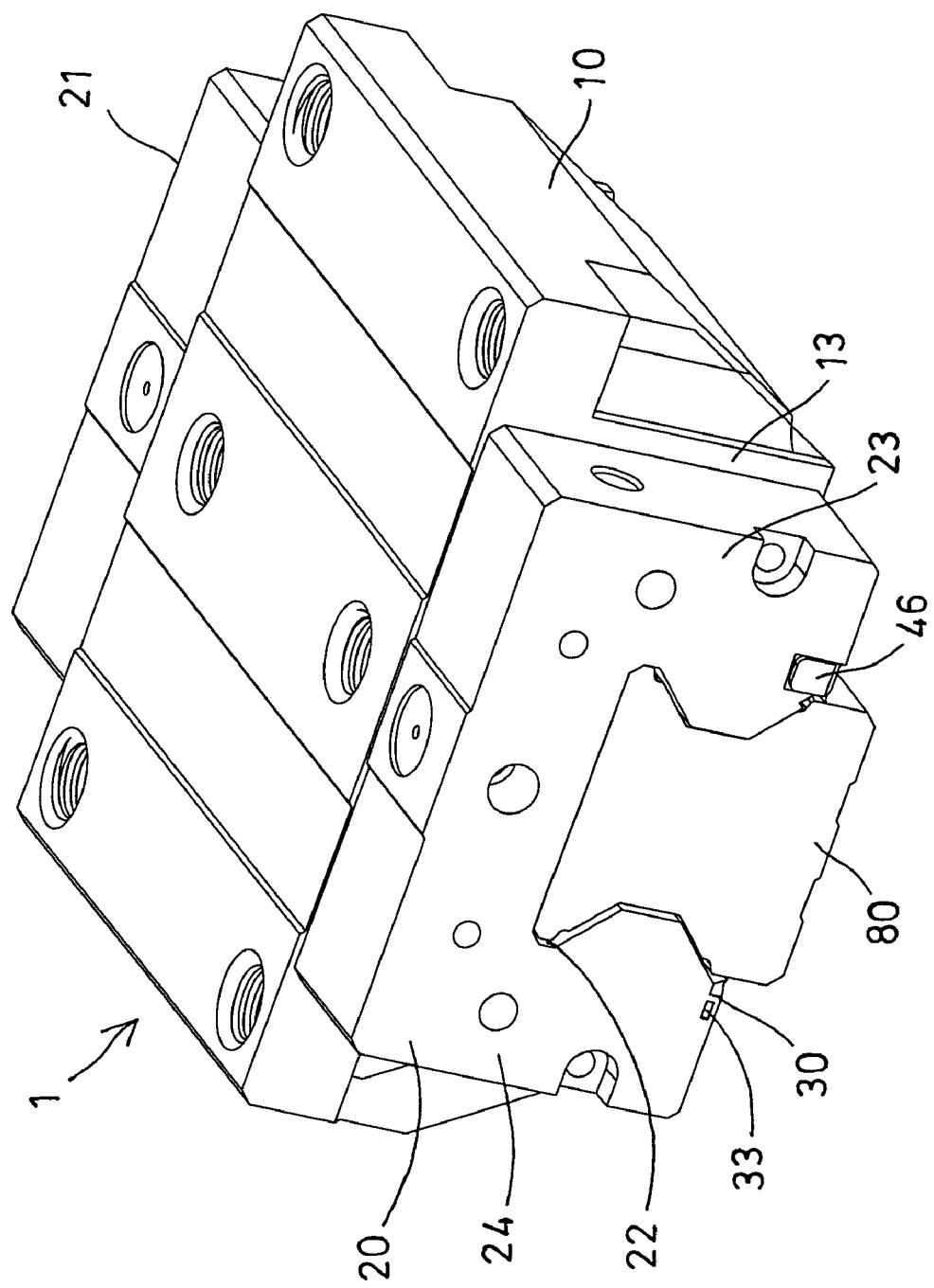
FIGS. 10, 11 are upper and bottom perspective views similar to FIGS. 1 and 2 respectively, illustrating the other arrangement of the linear motion guide device.
Figure 11:
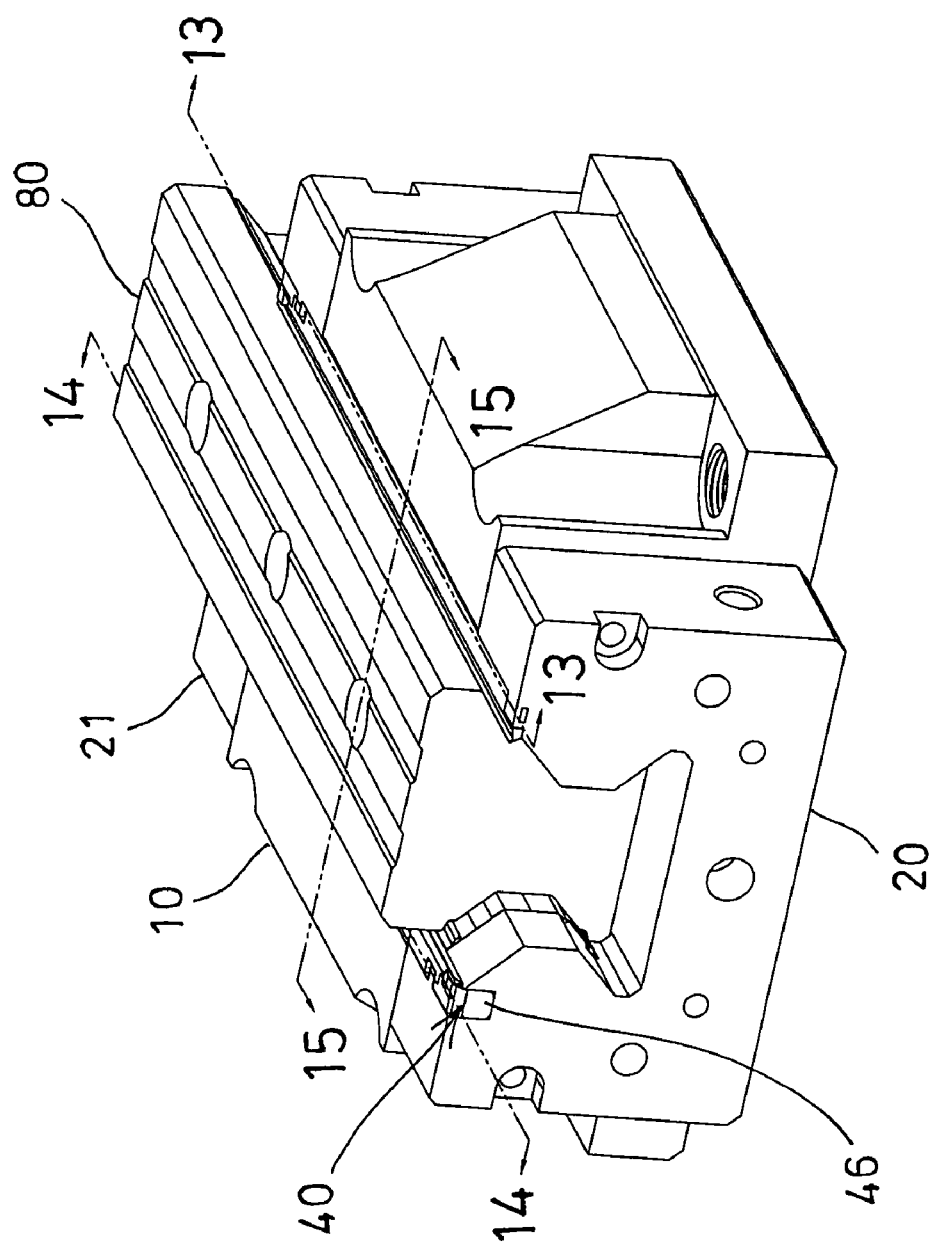
Figure 16:
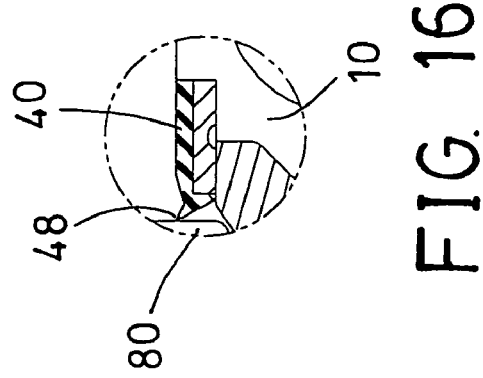
FIG. 16 is an enlarged partial cross sectional view of the linear motion guide device as shown in FIGS. 10-15.
Figure 15:
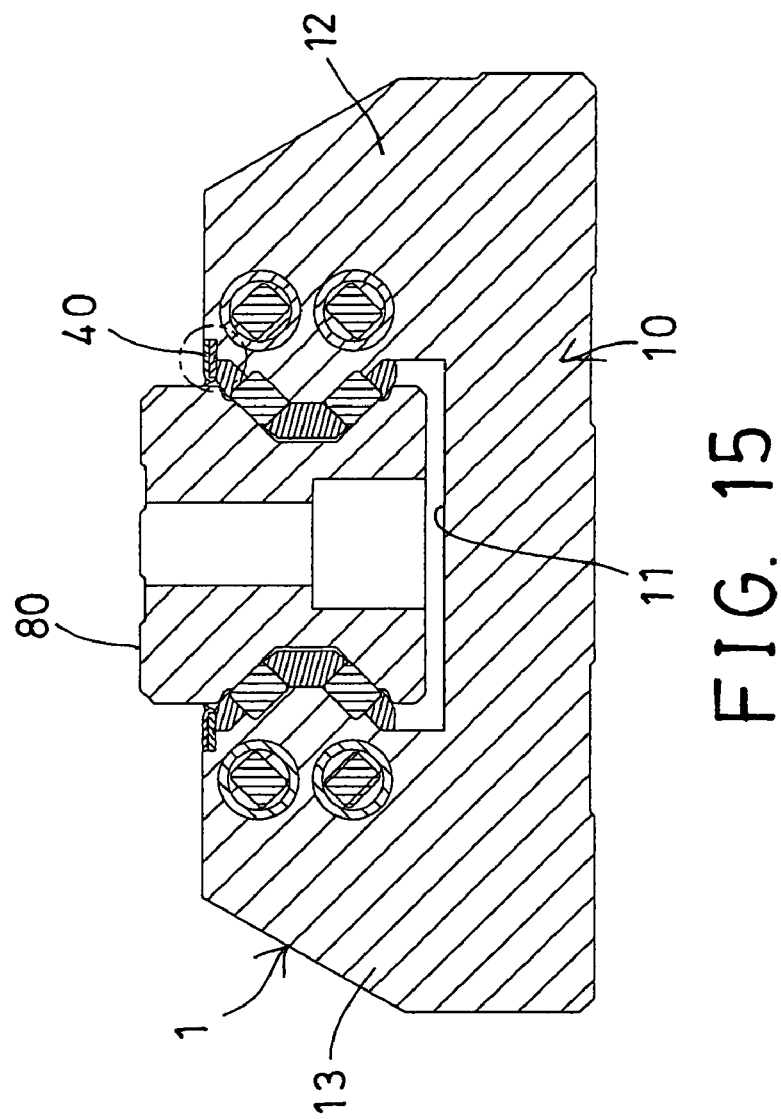
Figure 17:
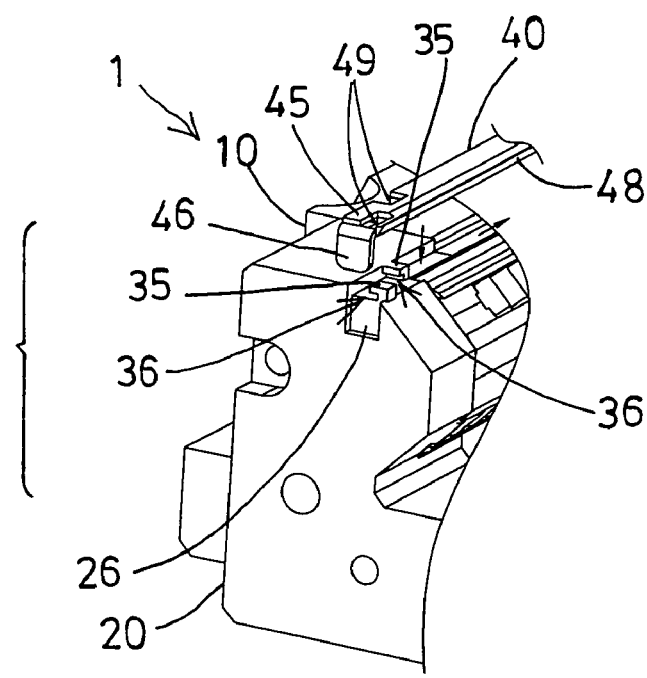
FIGS. 17, 18 are partial exploded views illustrating the attachment of the dust cap or dust shield to the housing and the end caps of the linear motion guide device as shown in FIGS. 10-16.
Figure 18:
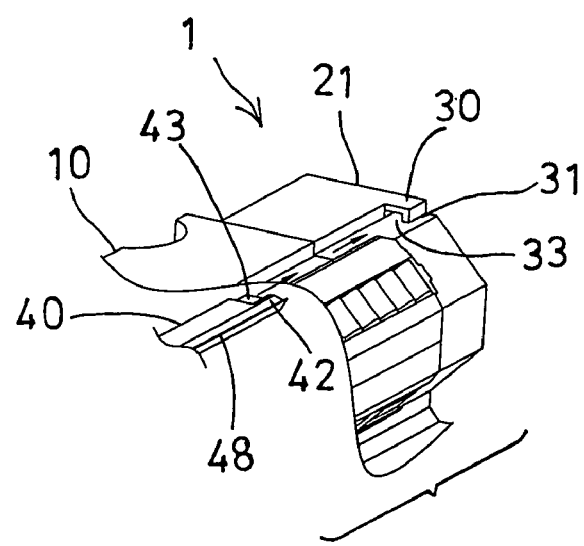

As best shown in FIGS. 3 and 8, the end caps 20, 21 each includes a depression 26 formed in an outer portion of one of the two side fences 23 and communicating with the shoulder or recess 25 thereof, and a catch 27 extended into or from the shoulder or recess 25 and the depression 26 thereof, for engaging with and for anchoring or locking the dust caps or dust shields 40 to the housing 10 and the end caps 20, 21, which will be discussed in more details hereinafter. It is preferable that the catch 27 includes an inclined surface 28, such as an outwardly facing inclined surface 28 formed thereon, best shown in FIGS. 3-5.

The end caps 20, 21 each further includes a casing 30 extended into the shoulder or recess 25 of the other side fence 24 (FIGS. 1-5 and 9), but slightly short of the shoulder or recess 25 thereof, to form or define a notch 31 therein, and the casing 30 includes a socket opening 33 formed therein and also communicating with the shoulder or recess 25 thereof, for engaging with and for anchoring or locking the dust caps or dust shields 40 to the housing 10 and the end caps 20, 21, which will also be discussed in more details hereinafter.

The dust shields 40 each includes one end 41 having a finger 42 and a latch 43 extended therefrom, and spaced away from each other with a gap or slot 44, or having the gap or slot 44 formed or provided between the finger 42 and the latch 43, for allowing the finger 42 and the latch 43 to be engaged into the notch 31 and the socket opening 33 of the casing 30 or of the end caps 20, 21, and engaged with the end caps 20, 21 respectively, and thus for detachably anchoring or locking the dust shield 40 to the housing 10 and the end caps 20, 21 without additional fasteners and tool members. It is preferable that the finger 42 includes a height or thickness greater than that of the latch 43.

The dust shields 40 each further includes another end 45 having a flap or ear 46 extended therefrom, and perpendicular thereto, for engaging into the depressions 26 of the end caps 20, 21 respectively, and having a perforation 47 formed therein for receiving the catch 27, and for further detachably anchoring or locking the dust shield 40 to the housing 10 and the end caps 20, 21 without additional fasteners and tool members. The inclined surface 28 of the catch 27 allows the catch 27 to be easily engaged into the perforation 47 of the ear 46.

Figure 7:
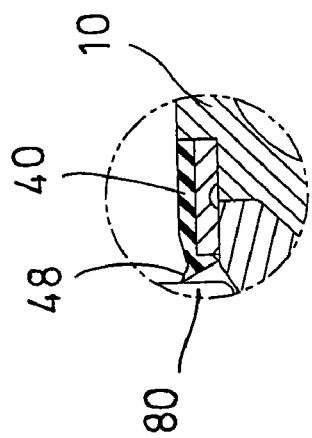
FIG. 7 is an enlarged partial cross sectional view of the linear motion guide device.

As best shown in FIG. 7, the dust shields 40 each includes a soft or resilient blade 48 secured or attached thereon with such as molding or mold injection processes, and preferably slightly extended out of the dust shields 40, for suitably engaging with the elongate track rail 80, and for providing a better seal to the slide 1.

Alternatively, as shown in FIGS. 10-18, the dust shields 40 each includes one or more perforations 49 formed in the other end 45 thereof, and the end caps 20, 21 each includes one or more tongues 35 extended from the side fence 23 thereof, for engaging through the perforations 49 of the dust shields 40, and each having a notch 36 formed therein for engaging with the dust shields 40, and for detachably anchoring or locking the dust shield 40 to the housing 10 and the end caps 20, 21 without additional fasteners and tool members.

Accordingly, the linear motion guide device in accordance with the present invention includes a readily attachable and detachable dust cap or dust shield, without additional fasteners and tool members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide device comprising:
    a slide including a housing having a chamber formed therein, and defined by two side walls,
    a first end cap and a second end cap secured to sides of said housing, and each including a space formed therein and defined by two side fences, and aligned with said chamber of said housing, for slidably receiving an elongate track rail, said first end cap including a depression formed therein and including a catch extended into said depression of said first end cap, and
    a dust shield including a first end detachably anchored to said first end cap, and a second end detachably anchored to said second end cap, for detachably securing said dust shield to said first and said second end caps and said housing without additional fasteners, and said dust shield including an ear extended therefrom for engaging into said depression of said first end cap, and including a perforation formed in said ear for receiving said catch of said first end cap and for detachably locking said dust shield to said first end cap.

2. The linear motion guide device as claimed in claim 1, wherein said first and said second end caps and said housing each includes a recess formed therein and communicating with each other, for receiving said dust shield.

3. The linear motion guide device as claimed in claim 1, wherein said catch of said first end cap includes an inclined surface formed thereon, for facilitating an engagement of said catch into said perforation of said dust shield.

4. The linear motion guide device as claimed in claim 1, wherein said second end cap includes a socket opening formed therein, and said dust shield includes a finger extended therefrom and engageable into said socket opening of said second end cap, for detachably securing said dust shield to said second end cap.

5. The linear motion guide device as claimed in claim 4, wherein said dust shield includes a latch extended therefrom and spaced away from said finger with a slot, for engaging with said second end cap, and for further detachably securing said dust shield to said second end cap.

6. The linear motion guide device as claimed in claim 5, wherein said second end cap includes a notch formed therein for receiving said latch of said dust shield.

7. The linear motion guide device as claimed in claim 1, wherein said dust shield includes a blade attached thereon for engaging with said track rail, and for providing a seal to said slide.

\* \* \* \* \*